(12) United States Patent
Lan

(10) Patent No.: US 6,938,300 B2
(45) Date of Patent: Sep. 6, 2005

(54) WHEEL ASSEMBLY FOR A STROLLER

(76) Inventor: Red Lan, 15F, No. 108, Sec. 1 Hsin Tai 5th Rd., Hsichih, Taipei Hsien (TW)

( * ) Notice: Subject to any disclaimer, the term of this patent is extended or adjusted under 35 U.S.C. 154(b) by 0 days.

(21) Appl. No.: 10/438,910

(22) Filed: May 16, 2003

(65) Prior Publication Data

US 2004/0226133 A1 Nov. 18, 2004

(51) Int. Cl.$^7$ .............................. B60B 33/00; B62B 7/04
(52) U.S. Cl. ....................... 16/18 R; 16/35 R; 16/18 A; 16/44; 16/31 R; 280/47.25; 280/642; 280/647; 280/657; 280/47.38
(58) Field of Search .............................. 16/35 R, 35 D, 16/44, 18 A, 29, 18 R, 45, 31 R; 301/1.12, 109, 110, 111.01, 111.04; 280/47.38, 47.22, 47.25, 642, 647, 650, 657–658, 47.24

(56) References Cited

U.S. PATENT DOCUMENTS

| | | | | |
|---|---|---|---|---|
| 4,410,194 A | * | 10/1983 | Steilen | 280/86 |
| 4,543,685 A | * | 10/1985 | Kassai | 16/35 R |
| 5,221,100 A | * | 6/1993 | McNutt | 280/78 |
| 5,232,071 A | * | 8/1993 | Kawanabe | 188/1.12 |
| 5,581,843 A | * | 12/1996 | Purnell | 16/35 R |
| 5,819,514 A | * | 10/1998 | Firdaus | 56/16.7 |
| 6,363,851 B1 | * | 4/2002 | Gerhard et al. | 101/483 |
| 6,543,798 B2 | * | 4/2003 | Schaffner et al. | 280/250.1 |
| 6,568,030 B1 | * | 5/2003 | Watanabe et al. | 16/44 |
| 6,607,201 B2 | * | 8/2003 | Marshburn | 280/79 |
| 6,663,121 B2 | | 12/2003 | Santos et al. | |

FOREIGN PATENT DOCUMENTS

| | | | |
|---|---|---|---|
| DE | 29912291 | 7/1999 | |
| DE | 1097733 | 5/2001 | |
| DE | 10100072 | 3/2002 | |
| JP | 55015345 A | * 2/1980 | ........... B62D/17/00 |
| JP | 2001097254 A | * 4/2001 | ........... B62D/53/00 |

OTHER PUBLICATIONS

United Kingdom Search Report, dated Nov. 14, 2003.

* cited by examiner

*Primary Examiner*—Chuck Y. Mah
(74) *Attorney, Agent, or Firm*—Baker Botts L.L.P.

(57) ABSTRACT

A wheel assembly for a stroller includes a wheel with a rim that has two vertical side surfaces and a vertical central plane. A vertical pivot shaft is disposed within a mounting space in the wheel, is located in the central plane, and extends through a fixed seat that is adapted to be mounted fixedly to a stroller frame and that is attached to a rotatable seat. A wheel seat is connected to the wheel and the rotatable seat so as to permit rotation of the wheel and the wheel seat about the vertical pivot shaft.

6 Claims, 9 Drawing Sheets

WHEEL ASSEMBLY FOR A STROLLER

BACKGROUND OF THE INVENTION

1. Field of the Invention

This invention relates to a stroller, and more particularly to a wheel assembly for a stroller, which includes a single wheel.

2. Description of the Related Art

Referring to FIGS. 1 and 2, a conventional stroller 1 is shown to include a stroller frame 10 with four legs 101, two front wheel assemblies 11 mounted respectively to two of the legs 101, and two rear wheel assemblies 12 mounted respectively to the other two of the legs 101. FIG. 2 is a bottom view of one of the front wheel assemblies 11. Each of the front wheel assemblies 11 includes two front wheels 13, a wheel seat 14 disposed between the front wheels 12, and a wheel axle 15 extending through the front wheels 13 and the wheel seat 14. Each of the wheel seats 14 has a leg-connecting portion 141 sleeved rotatably on a respective one of the legs 101, and an axle-connecting portion 142, within which the wheel axle 15 is journalled. To enhance the comfort of the baby carried on the stroller 1, a vibration-absorbing device (not shown) can be disposed within the axle-connecting portion 142 of each of the wheel seats 14.

When it is desired to push the stroller 1 to advance along a straight path, a forward force (A) is applied to the stroller frame 10. In each of the front wheel assemblies 11, since the forward force (A) is located midway between two frictional forces (B) that are generated between the ground and the front wheels 13 and since the direction of the forward force (A) is parallel to those of the frictional forces (B), the stroller 1 can advance along a straight path 16. When the stroller 1 moves over a lawn or uneven road surfaces, it is necessary for the stroller wheels to have a large diameter so as to ensure the comfort of the baby. However, if each of the front wheel assemblies 11 has two large-diameter front wheels 13, the total volume and weight of the stroller 1 will increase significantly so that it is difficult to push the stroller 1.

SUMMARY OF THE INVENTION

The object of this invention is to provide a wheel assembly for a stroller, which includes a single wheel, thereby reducing the total volume and weight of the stroller.

According to this invention, a wheel assembly for a stroller having a stroller frame is adapted to be mounted to the stroller frame, and comprises a wheel unit including a wheel and a wheel axle that is coupled to the wheel so as to permit rotation of the wheel about the wheel axle. The wheel has a rim and a wheel wall. The rim defines a mounting space therein, and has a vertical inner side surface that is adapted to be proximate to the stroller frame, a vertical outer side surface that is opposite to the inner side surface and that is adapted to be distal from the stroller frame, and a vertical central plane that is located between the inner and outer side surfaces. A fixed seat is adapted to be mounted fixedly to the stroller frame, and has a pivot-mounting portion that extends into the mounting space in the wheel of the wheel unit. A vertical pivot shaft is disposed on the pivot-mounting portion of the fixed seat, and extends in the central plane of the rim of the wheel unit. A wheel seat unit is connected to the wheel unit and the vertical pivot shaft, and is rotatable about the vertical pivot shaft. The wheel axle is journalled on the wheel seat.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
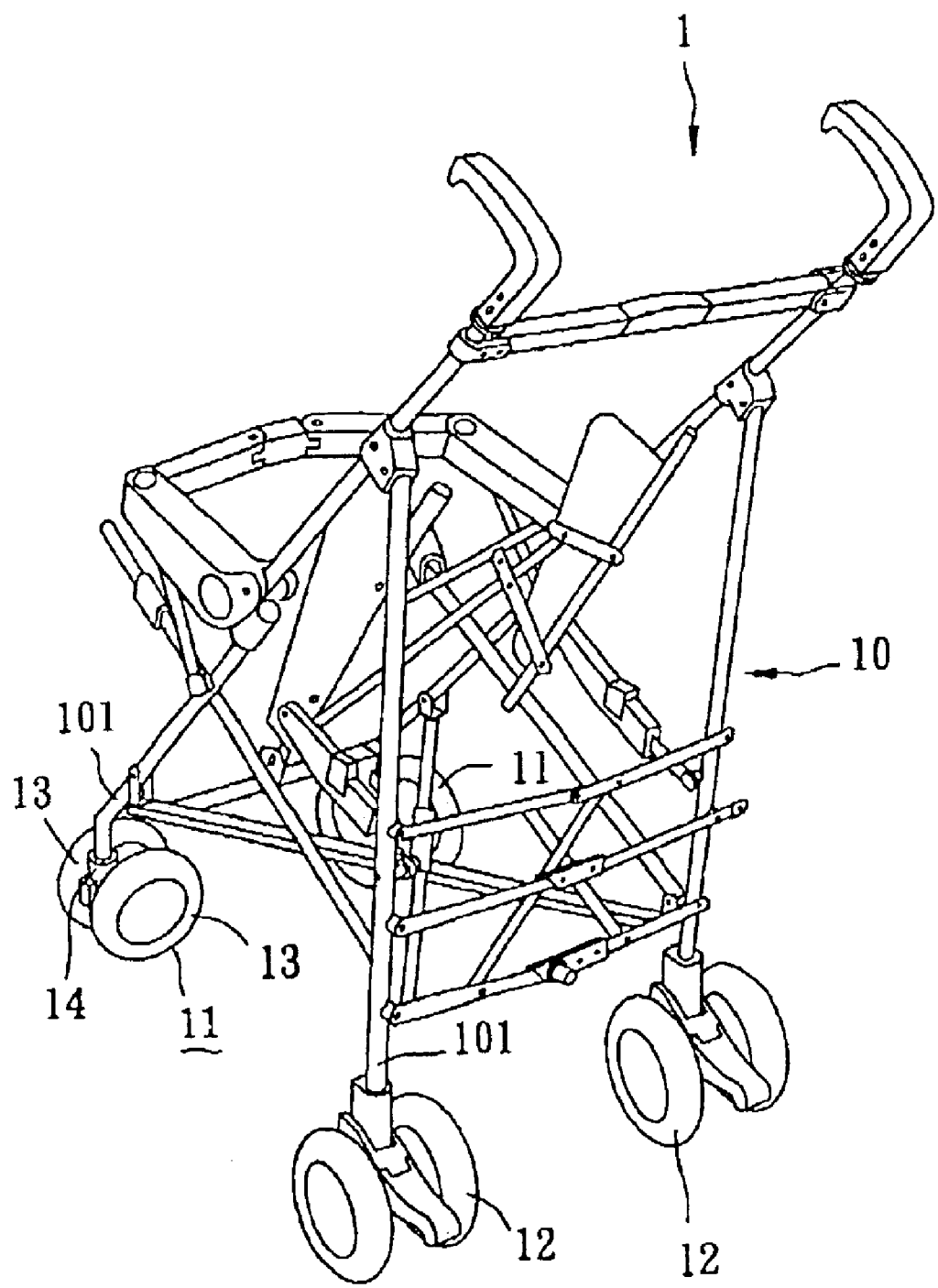
FIG. 1 is a perspective view of a conventional stroller that includes two front wheel assemblies, each of which has two front wheels.
Figure 2:
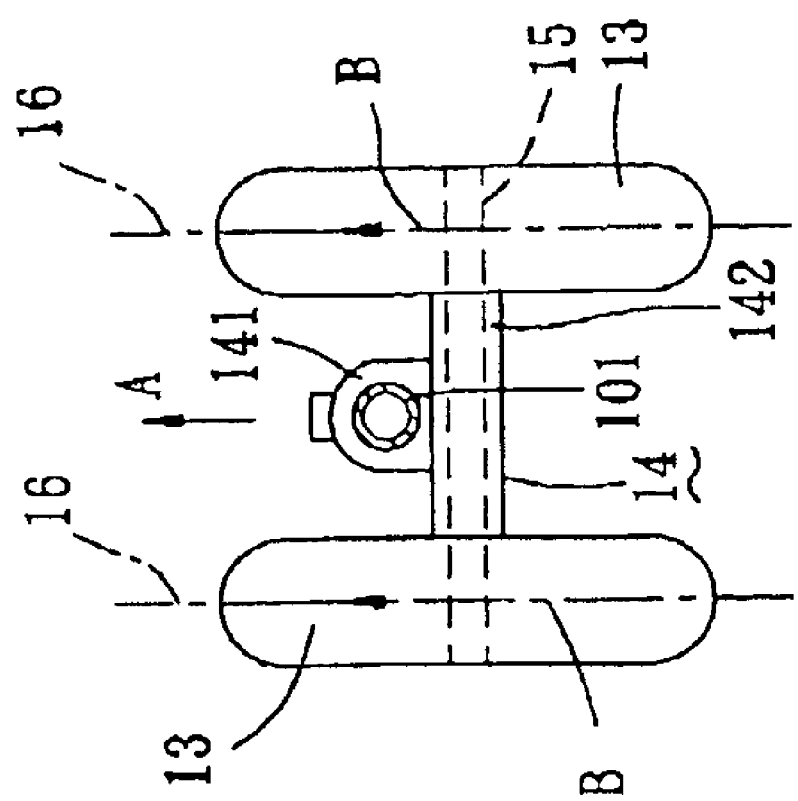
FIG. 2 is a bottom view of one front wheel assembly of the conventional stroller.
Figure 3:
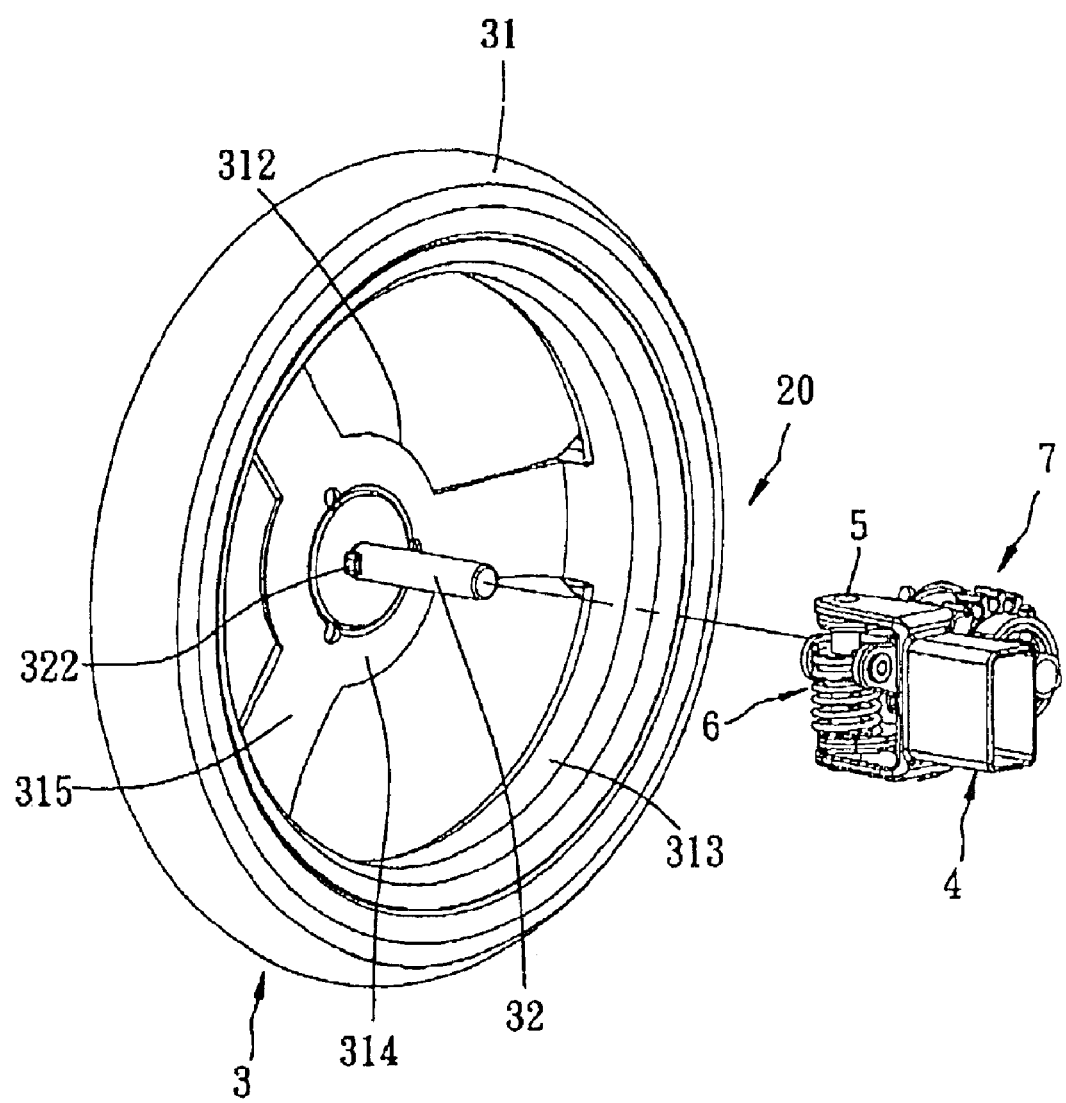
FIG. 3 is a partly exploded perspective view of the preferred embodiment of a wheel assembly according to this invention.
Figure 4:
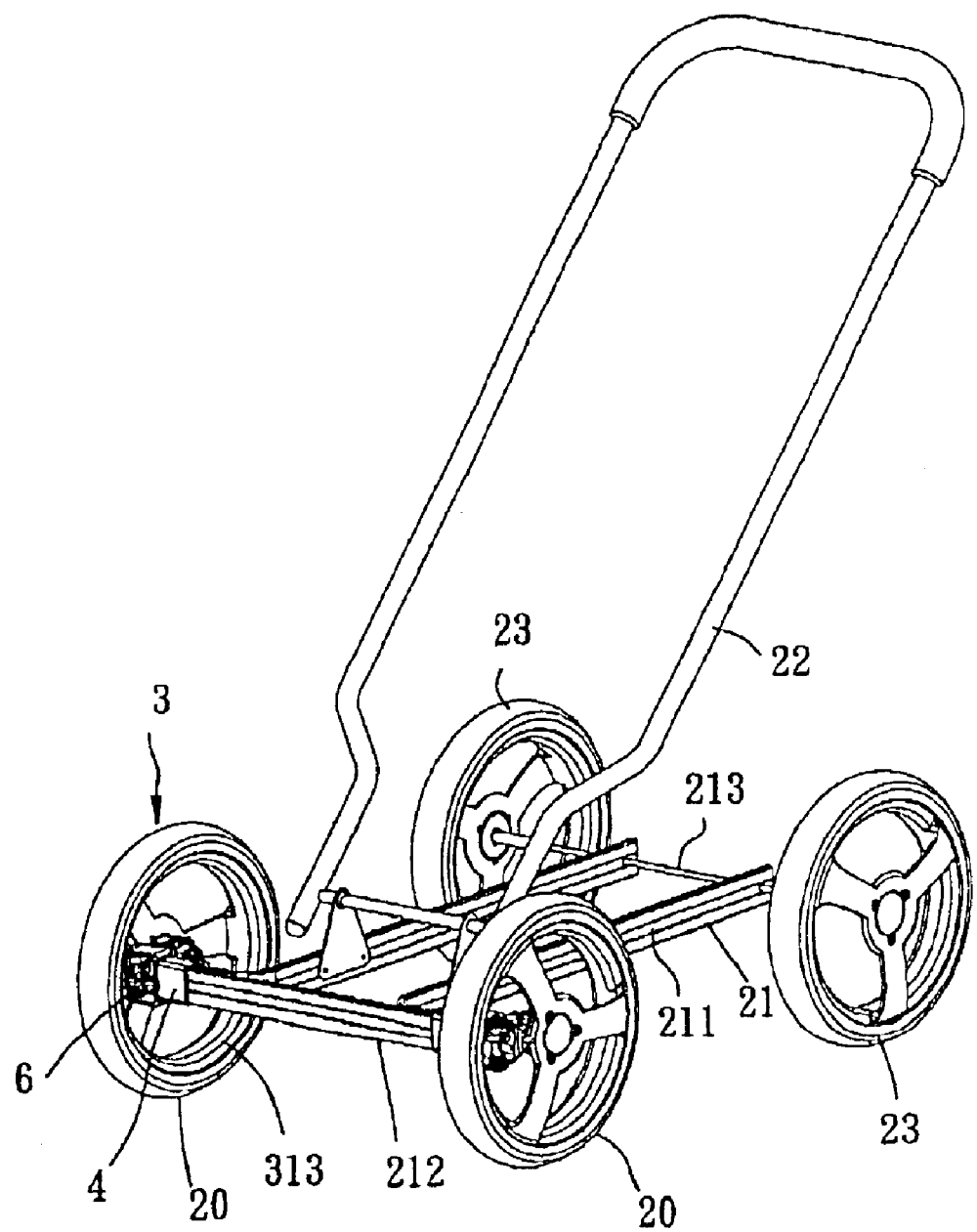
FIG. 4 is a perspective view of a stroller incorporating the preferred embodiment.

Referring to FIGS. 3 and 4, a stroller is shown to include two front wheel assemblies 20, a stroller frame 21, a hand-push frame 22, and two rear wheel assemblies 23. Each of the front wheel assemblies 20 embodies a wheel assembly according to this invention. The stroller frame 21 includes two side bars 211, a front bar 212 having two ends that are connected respectively and fixedly to front ends of the side bars 211, and a rear bar 213 that is connected fixedly to rear ends of the side bars 211. The front wheel assemblies 20 are mounted respectively to two ends of the front bar 212 of the stroller frame 21. The hand-push frame 22 is mounted pivotally to the side bars 211. The rear wheel assemblies 23 are mounted respectively to two ends of the rear bar 213.

One of the front wheel assemblies 20 will be described in the succeeding paragraphs.

The front wheel assembly 20 includes a wheel unit 3, a fixed seat 4, a vertical pivot shaft 5, a wheel seat unit 6, and a braking mechanism 7.

Figure 5:
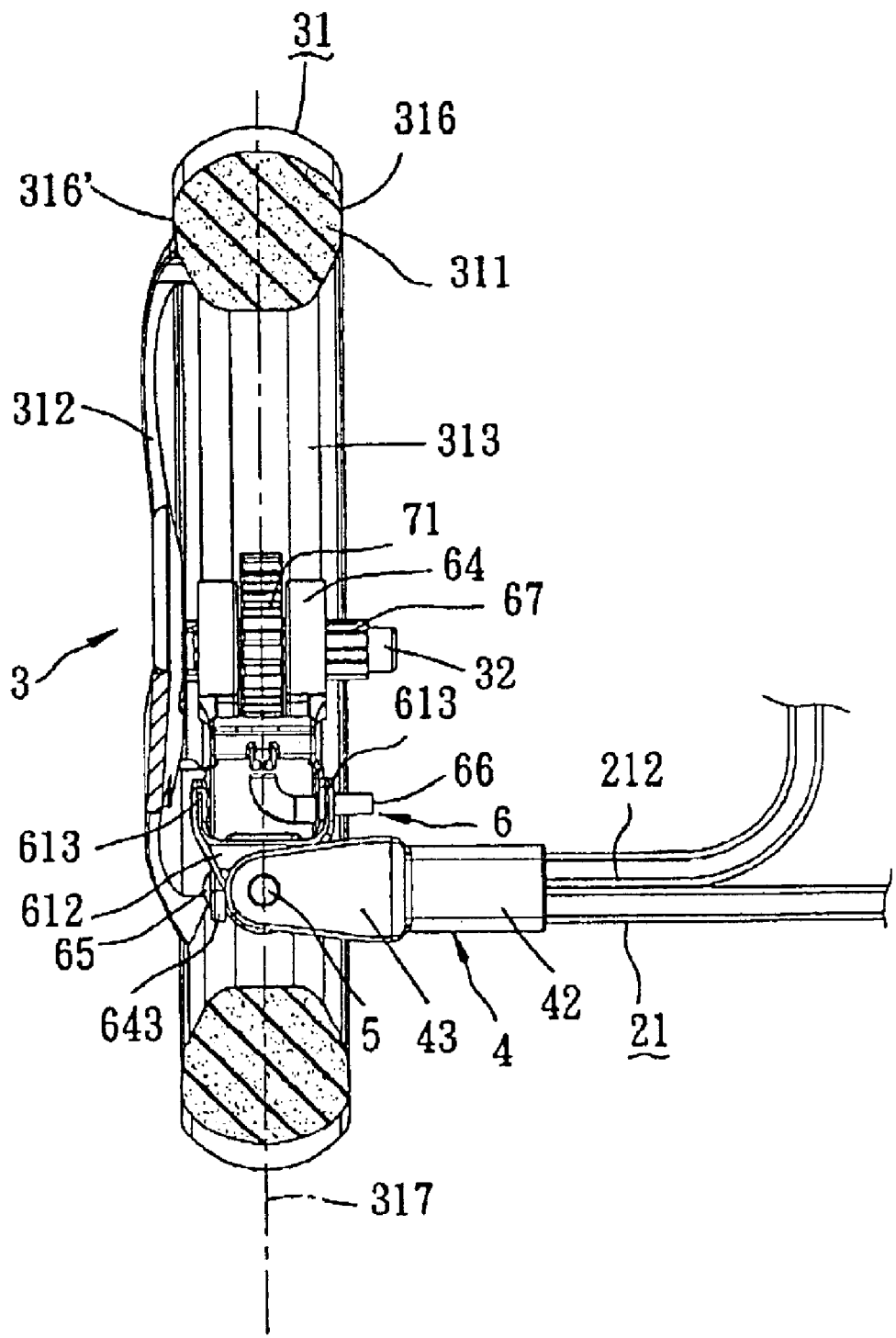
FIG. 5 is a partly sectional view of the preferred embodiment when a wheel is disposed at a forward position.

Referring to FIGS. 3 and 5, the wheel unit 3 includes a wheel 31 and a wheel axle 32 that is coupled to the wheel 31 so as to permit rotation of the wheel 31 about the wheel axle 32. The wheel 31 has a rim 311, a wheel wall 312, and a mounting space 313 that is defined within the rim 311. The wheel wall 312 has a circular central portion 314 and three equidistant radial portions 315 that are connected fixedly to the central portion 314 and the rim 313. The rim 311 has a vertical inner side surface 316 that is proximate to the stroller frame 21, a vertical outer side surface 316' that is opposite to the inner side surface 316 and that is distal from the stroller frame 21, and a vertical central plane 317 between the inner and outer side surfaces 316, 316'.

Figure 6:
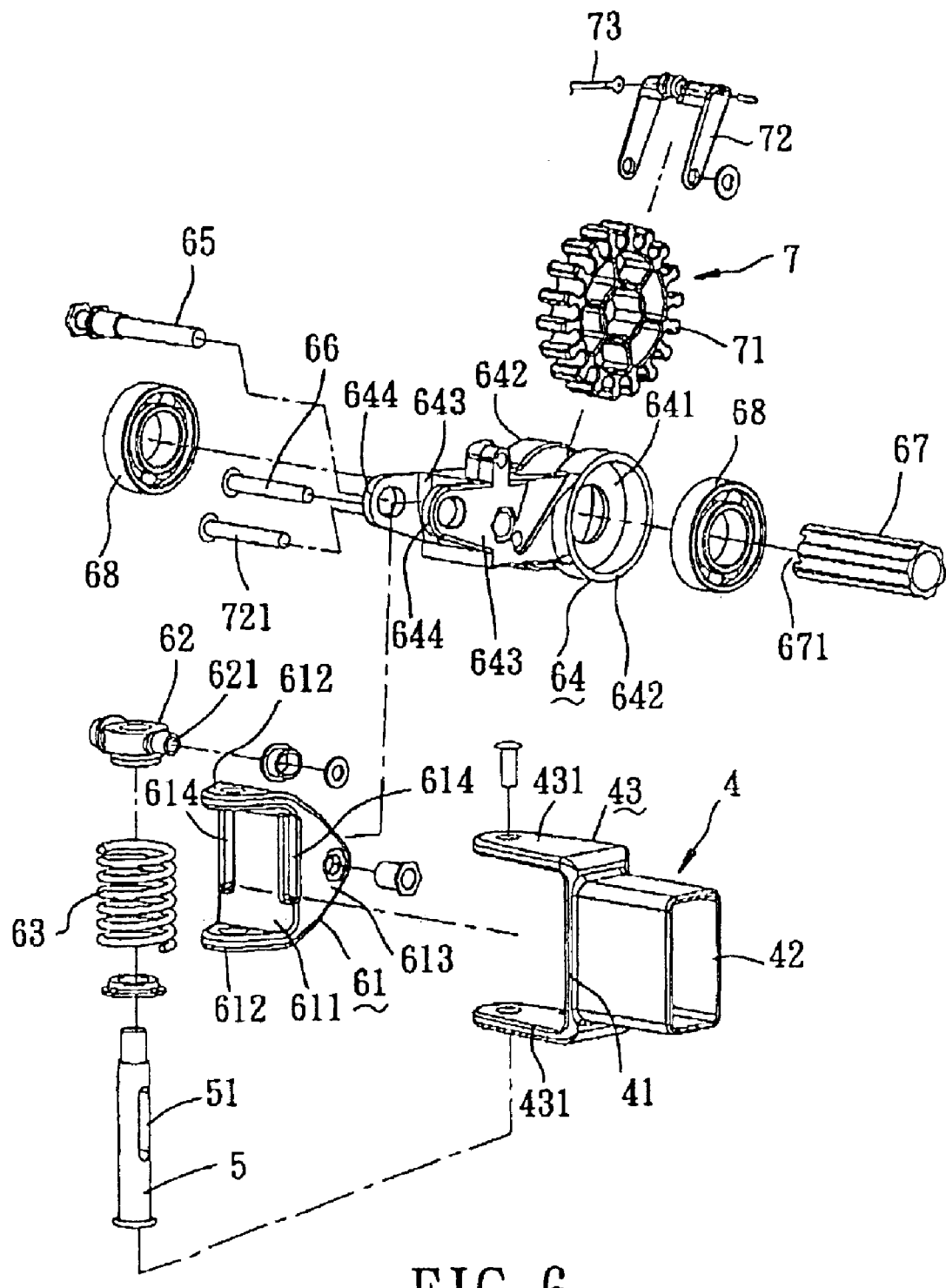
FIG. 6 is an exploded perspective view of the preferred embodiment.

Referring to FIGS. 5 and 6, the fixed seat 4 includes a vertical base plate 41, a sleeve portion 42 extending integrally from the base plate 41 and sleeved fixedly on the front bar 212 of the stroller frame 21, and a pivot mounting portion 43 that extends into the mounting space 313 in the wheel 31 of the wheel unit 3 and that is formed with two first horizontal plates 431 which are aligned along a vertical direction.

The vertical pivot shaft S extends through the pivot-mounting portion 43 of the fixed seat 4, is located in the central plane 317 of the rim 311, and is formed with a vertical slot 51 therethrough.

The wheel seat unit 6 includes a rotatable seat 61, a movable member 62, a resilient element 63, a wheel seat 64, a horizontal pin 65, a horizontal pivot shaft 66, an axle-surrounding tube 67, and two bearings 68.

The rotatable seat 61 includes a vertical base plate 611, two second horizontal plates 612 that extend integrally from one side surface of the base plate 611 and that are aligned along the vertical direction, two first vertical plates 613 that extend integrally and perpendicularly from an opposite side surface of the base plate 611 and that are aligned along a horizontal direction, and two aligned vertical slots 614. The second horizontal plates 612 are sleeved rotatably on the vertical pivot shaft 5, and are disposed between the first horizontal plates 431 of the fixed seat 4. As such, the rotatable seat 61 is rotatable relative to the fixed seat 4.

The movable member 62 and the resilient element 63 are sleeved movably on the vertical pivot shaft S between the second horizontal plates 612 of the rotatable seat 61. The resilient element 63 is shaped as a coiled compression spring, and is disposed immediately under the movable member 62 so as to bias the movable member 62 upwardly toward the upper second horizontal plate 612 of the rotatable seat 61.

The wheel seat 64 includes two vertical annular plates 641 that are sleeved movably around the wheel axle 32, two cylindrical sleeves 642 that extend respectively, integrally, and perpendicularly from outer peripheries of the annular plates 641 and away from each other, and two second vertical plates 643 that are connected fixedly to the annular plates 641, that are aligned along the horizontal direction, and that extend respectively through the vertical slots 614 in the rotatable seat 61. Each of the second vertical plates 643 has a pivot end 644.

The horizontal pin 65 extends through a pin hole 621 in the movable member 62, the vertical slot 51 in the vertical pivot shaft 5, and the pivot ends 644 of the second vertical plates 643 of the wheel seat 64 so that the resilient element 63 can dampen movement of the wheel unit 3 relative to the stroller frame 21, thereby absorbing vibration of the wheel unit 3.

The horizontal pivot shaft 66 extends through the first vertical plates 613 of the rotatable seat 61 and the second vertical plates 643 of the wheel seat 64 so as to permit rotation of the rotatable seat 61 and the wheel seat 64 about the horizontal pivot shaft 66.

The axle surrounding tube 67 is sleeved around the wheel axle 32, and has an outer surface that is formed with a plurality of axially extending slots 671, one of which engages a key 322 (see FIG. 3) on the wheel axle 32 so as to permit synchronous rotation of the axle-surrounding tube 67 and the wheel axle 32.

The bearings 68 are disposed respectively within the cylindrical sleeves 642 of the wheel seat 64, and are sleeved on the axle-surrounding tube 67.

The braking mechanism 7 includes a braking wheel 71 that is disposed between the two annular plates 641 and that can rotate synchronously with the axle-surrounding tube 67, a gripping member 72 connected rotatably to the second vertical plates 643 of the wheel seat 64 by means of a horizontal pin 721, and a control member 73 that can be operated to move the gripping member 72 between a gripping position and a non-gripping position. Since the structure and operation of the braking mechanism 7 are not pertinent to the claimed invention, a detailed description thereof will be omitted herein for the sake of brevity.

Figure 7:
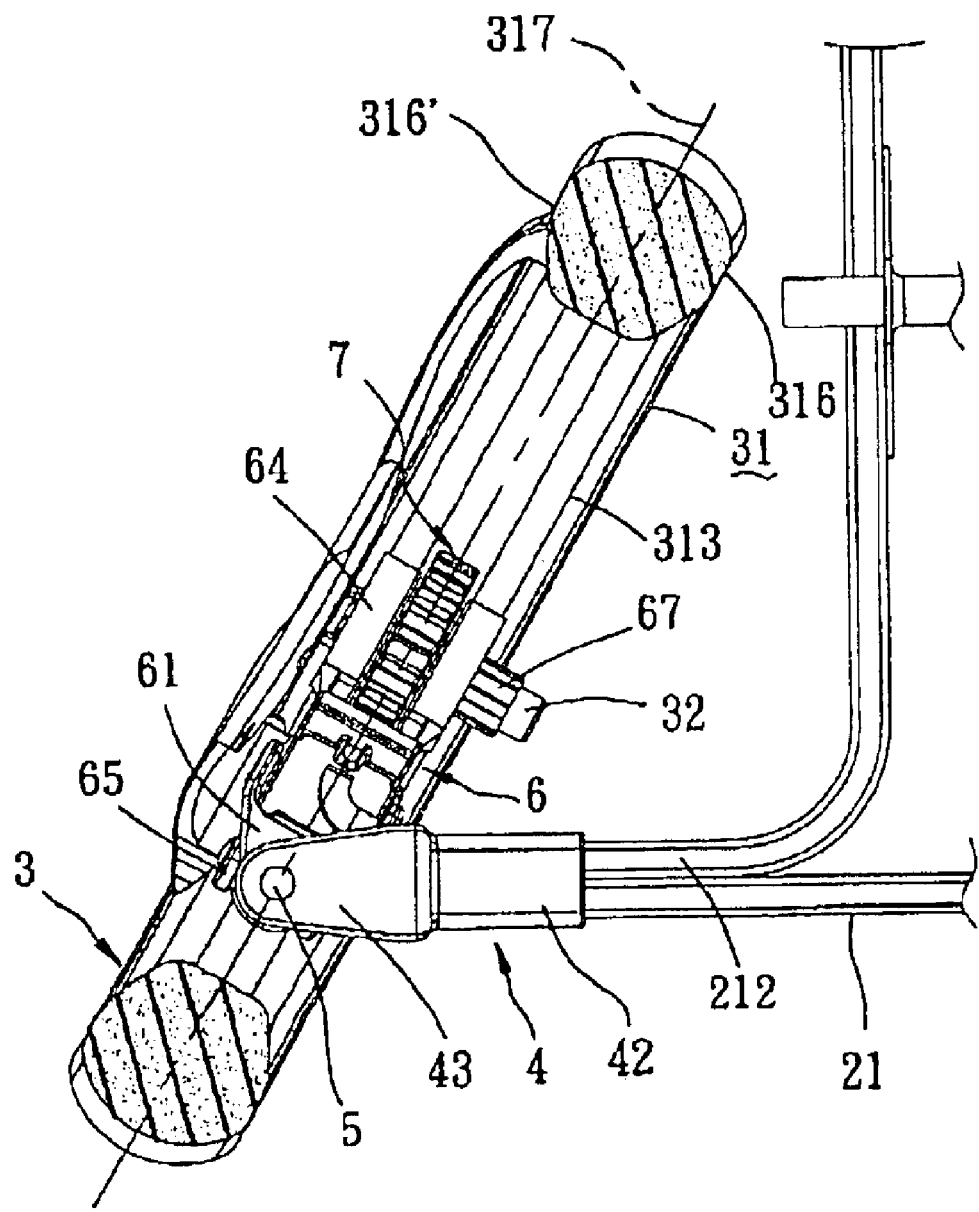
FIG. 7 is a partly sectional view of the preferred embodiment when the wheel is disposed at an inclined position.

Referring to FIG. 7, when the wheel 31 is disposed at an inclined position, because the vertical pivot shaft 5 extends in the central plane 317 of the wheel 31, the wheel seat unit 6 can rotate smoothly relative to the stroller frame 21.

Figure 8:
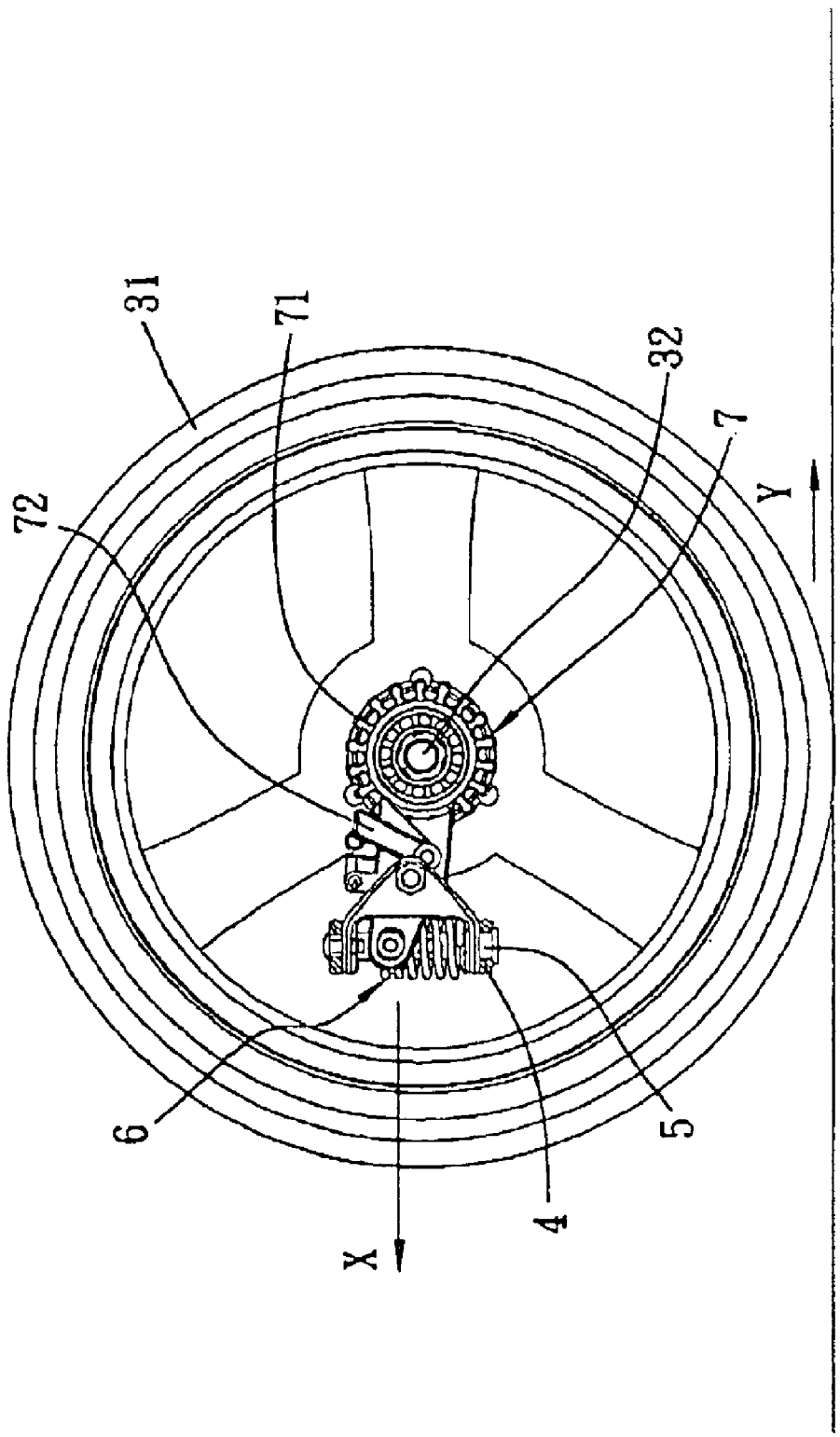
FIG. 8 is a side view of the preferred embodiment.

Referring to FIGS. 5 and 8, in which the wheel 31 is shown to be disposed at a forward position, when a forward force (x) is applied to the stroller frame 21, because a frictional force (Y) between the wheel 31 and the ground and the forward force (X) are in the central plane 317, the wheel 31 will move along a straight path.

Figure 9:
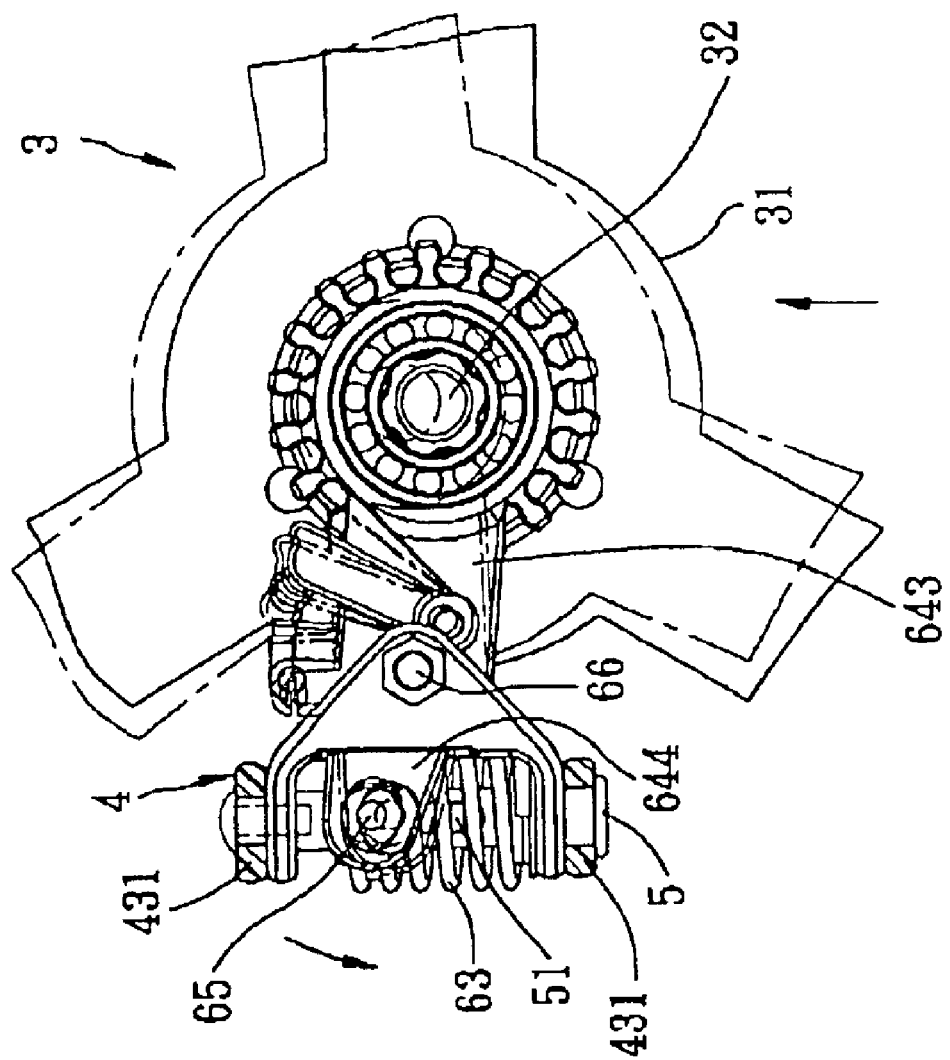
FIG. 9 is a fragmentary side view of the preferred embodiment illustrating how vibration of the wheel is absorbed.

Referring to FIGS. 6 and 9, when the wheel unit 3 is subjected to vibration, the resilient element 63 can dampen the movement of the wheel unit 3.

Because the front wheel assembly 20 includes only one wheel 31, the diameter of the latter can be increased significantly to enable the stroller to move smoothly over lawns and uneven road surfaces, thereby increasing the range of application of the front wheel assembly 20.

With this invention thus explained, it is apparent that numerous modifications and variations can be made without departing the scope and spirit of this invention. It is therefore intended that this invention be limited only as indicated by the appended claims.

I claim:

1. A stroller having a stroller frame, a pair of front wheel assemblies disposed on a front end of said stroller, and a pair of rear wheel assemblies disposed on a rear end of said stroller, each of said front wheel assemblies comprising:
    a wheel unit including a wheel and a wheel axle that is coupled to said wheel so as to permit rotation of said wheel about said wheel axle, said wheel having a rim and a wheel wall, said rim defining a mounting space therein and having a vertical inner side surface that is adapted to be proximate to the stroller frame, a vertical outer side surface that is opposite to said inner side surface and that is adapted to be distal from the stroller frame, and a vertical central plane that is located between said inner and outer side surfaces;
    a fixed seat mounted fixedly to the stroller frame and having a fixed pivot-mounting portion that extends into said mounting space in said wheel of said wheel unit;
    a vertical pivot shaft disposed on said pivot-mounting portion of said fixed seat and extending in said vertical central plane of said rim, said vertical pivot shaft being spaced apart from said wheel axle of said wheel unit; and
    a wheel seat unit connected to said wheel unit and said vertical pivot shaft and rotatable about said vertical pivot shaft, said wheel axle being journalled n said wheel seat unit.

2. The stroller as claimed in claim 1, wherein said pivot-mounting portion of said fixed seat is formed with two first horizontal plates that are aligned along a vertical direction, said wheel seat unit including:
    a rotatable seat having two second horizontal plates that are inter connected fixedly and that are aligned along the vertical direction, said vertical pivot shaft extending through said first horizontal plates of said fixed seat and said second horizontal plates of said rotatable seat so as to permit rotation of said rotatable seat about said vertical pivot shaft;
    a wheel seat attached to said rotatable seat, said wheel axle being journalled on said wheel seat; and a horizontal pivot shaft extending through said rotatable seat and said wheel seat so as to permit rotation of said rotatable seat and said wheel seat about said horizontal pivot shaft.

3. The stroller as claimed in claim 2, wherein said rotatable seat further has a vertical base plate formed integrally with said second horizontal plates, and two first vertical plates that extend integrally and perpendicularly from said vertical base plate, said wheel seat having two second vertical plates that are aligned along the horizontal direction, said horizontal pivot shaft extending through said first vertical plates of said rotatable seat and said second vertical plates of said wheel seat.

4. The stroller as claimed in claim 3, wherein said vertical pivot shaft is formed with a vertical slot therethrough, said second horizontal plates of said rotatable seat being disposed between said first horizontal plates of said fixed seat, said wheel seat unit further including:
- a movable member sleeved movably on said vertical pivot shaft between said second horizontal plates of said rotatable seat, said movable member having a horizontal pin hole formed therethrough;
- a resilient element for biasing said movable member upwardly toward an upper one of said second horizontal plates of said rotatable seat; and
- a horizontal pin extending through said pin hole in said movable member, said vertical slot in said vertical pivot shaft, and said second vertical plates of said wheel seat so that said resilient element can dampen movement of said wheel unit relative to the stroller frame, thereby absorbing vibration of said wheel unit.

5. The stroller as claimed in claim 1, wherein said wheel seat includes two vertical annular plates that are sleeve rotatably around said wheel axle, and two cylindrical sleeves that extend respectively, integrally, and perpendicularly from outer peripheries of said annular plates and away from each other, said wheel seat unit further including:
- two bearings disposed respectively within said sleeves; and
- an axle-surrounding tube sleeved around said wheel axle so as to permit synchronous rotation with said wheel axle.

6. The stroller as claimed in claim 1, wherein said wheel seat unit includes:
- a rotatable seat sleeved rotatably on said vertical pivot shaft;
- a wheel seat, on which said wheel axle is journalled;
- a horizontal pivot shaft extending through said rotatable seat and said wheel seat so as to permit rotation of said rotatable seat and said wheel seat about said horizontal pivot shaft; and
- a resilient element sleeved on said vertical pivot shaft so as to dampen movement of said wheel unit relative to the stroller frame, thereby absorbing vibration of skid wheel unit.

* * * * *